(12) United States Patent
Doppelmayr

(10) Patent No.: US 6,862,998 B2
(45) Date of Patent: Mar. 8, 2005

(54) AERIAL CABLEWAY SYSTEM AND CABLEWAY CABIN

(75) Inventor: Michael Doppelmayr, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/619,129

(22) Filed: Jul. 14, 2003

(65) Prior Publication Data

US 2004/0094061 A1 May 20, 2004

(30) Foreign Application Priority Data

Nov. 14, 2002 (AT) .......................................... 1718/2002

(51) Int. Cl.[7] .............................................. B61B 3/00
(52) U.S. Cl. .................................... 105/149.1; 105/156
(58) Field of Search .......................... 105/149.1, 149.2, 105/149, 156, 148, 152, 150, 154, 155; 104/89, 75, 93, 94, 95, 112, 115, 116

(56) References Cited

U.S. PATENT DOCUMENTS

| | | | | |
|---|---|---|---|---|
| 2,538,998 A | * | 1/1951 | Whitcroft .................... | 198/682 |
| 4,280,411 A | * | 7/1981 | Katayose et al. ........... | 104/112 |
| 4,314,512 A | * | 2/1982 | Gerhard et al. ............. | 105/149 |
| 4,338,863 A | * | 7/1982 | Tauzin ......................... | 104/89 |
| 5,381,737 A | * | 1/1995 | Trenary ..................... | 105/34.1 |

FOREIGN PATENT DOCUMENTS

AU             002 469 U1     10/1998

* cited by examiner

Primary Examiner—Mark T. Le
(74) Attorney, Agent, or Firm—Laurence A. Greenberg; Werner H. Stemer; Ralph E. Locher

(57) ABSTRACT

An aerial cableway system has an endless, closed load-bearing and conveying cable which, in the terminal stations, is guided over drive or deflection wheels. Transportation devices, such as cabins and chairs, can be fixed to the load-bearing and conveying cable via a suspension bar in each case. A bearing at the lower end of the suspension bar mounts the transportation device such that it can rotate about an at least approximately vertical axis. The bearing is attached to the suspension bar via a damping device.

6 Claims, 3 Drawing Sheets

AERIAL CABLEWAY SYSTEM AND CABLEWAY CABIN

BACKGROUND OF THE INVENTION

Field of the Invention

The present invention relates to an aerial cableway system (also referred to as a cable railroad system, ropeway system, aerial tram, etc.) having an endless, closed load-bearing and conveying cable which, in the terminal stations, is guided over drive and deflection wheels. The system further includes transportation devices, such as cabins and chairs, which can be clamped to the load-bearing and conveying cable by way of a suspension bar in each case. A support bearing is provided at the lower end of the suspension bar, to which the transportation device is mounted such that it can rotate about a substantially vertical axis.

Austrian utility model AT-U1 2469 discloses a cableway system in which the transportation devices, in particular the cableway cabins, can be rotated with respect to the suspension bars. This ability of the transportation device to rotate means that the particular effect is achieved whereby the users of the cableway system can observe the entire landscape without restrictions.

SUMMARY OF THE INVENTION

It is accordingly an object of the invention to provide an aerial cableway system, which further improves the heretofore-known devices and methods of this general type and provides for an improved cableway system and cabin that better meets the requirements for the desired comfort than is the case in the prior art cable railroad system.

With the foregoing and other objects in view there is provided, in accordance with the invention, a cableway system, comprising:

terminal stations formed with deflection wheels;

an endless load-bearing and conveying cable extending between the terminal stations and traveling about the deflection wheels in the terminal stations;

transportation devices (cabins, chairs, etc.) each having a load-bearing suspension bar to be clamped to the cable for slaving the respective the transportation device along between the terminal stations;

a bearing for rotatably mounting the transportation device to the suspension bar about a substantially vertical axis; and a damping device disposed to damp the mounting between the bearing and the suspension bar.

In other words, according to the invention, the objects are achieved by the attachment of the bearing to the suspension bar being formed by a damping device. By means of this damping device, it is ensured that, during the movement of the transportation device over cable rollers, shocks that occur are damped to the greatest possible extent, so that these are not perceived by the passengers.

In accordance with an added feature of the invention, a substantially horizontal beam is disposed at a lower end of the suspension bar. Damping elements thereby have first ends attached to the beam and second ends attached to the bearing.

In accordance with an additional feature of the invention, the transportation device is a cableway cabin with a roof, and a drive motor is disposed on the roof of the cableway cabin, for rotating the cableway cabin relative to the suspension bar.

In accordance with a preferred feature of the invention, there are provided solar elements supported on the transportation device, preferably on the roof of the cabin.

An approximately horizontally aligned beam is preferably arranged at the lower end of the load-bearing bar, to which beam the ends of damping elements are attached, whose other ends are attached to the bearing. By means of this measure, an optimally damped suspension of the transportation device is achieved in a simple way.

The drive motor is preferably arranged on the roof of the cableway cabin. Furthermore, the transportation device, in particular the cable railroad cabins, are preferably equipped with a battery and with solar elements for charging the battery.

Other features which are considered as characteristic for the invention are set forth in the appended claims.

Although the invention is illustrated and described herein as embodied in a cable railroad system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
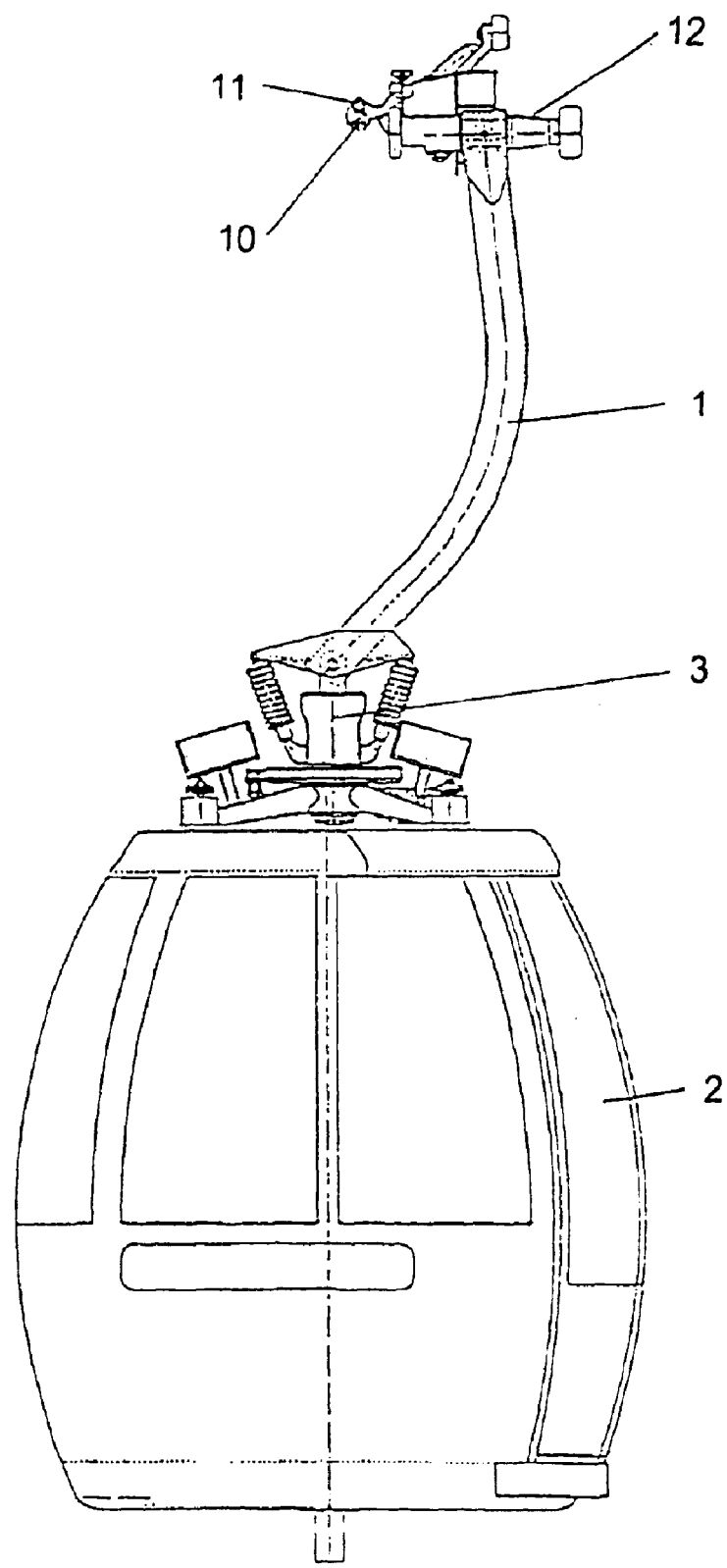
FIG. 1 is a front elevational view of a suspended cabin in an aerial cableway system according to the invention.

Referring now to the figures of the drawing in detail and first, particularly, to FIG. 1 thereof, there is shown a cabin 2 that is suspended at a lower end of a suspension bar 1. A clamping device 11 and a trolley 12 are disposed at the upper end of the suspension bar 1. The clamping device 11 allows the cabin 2 to be coupled to a load-bearing and conveying cable 10 of the cableway system.

Figure 3:
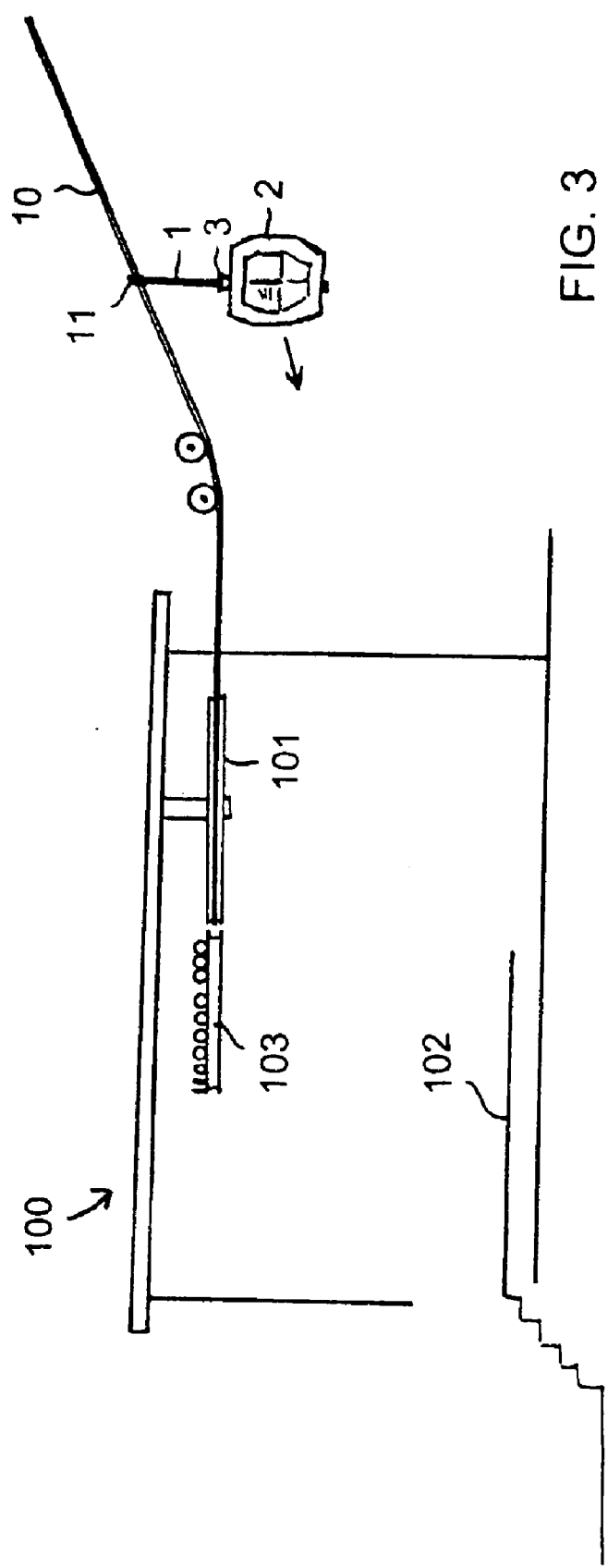
FIG. 3 is a diagrammatic side view of an end station of the cableway system according to the invention.

With reference to the diagrammatic illustration of FIG. 3, the endless cable 10 travels between terminals or end stations 100 (valley stations, mountain stations), where it is deflected about pulley wheels 101. In the stations 100, the cableway cabin 2 is decoupled from the load-bearing and conveying cable 10, and it is moved through the station—along boarding ramps 102 at which persons can disembark from or enter into the cabin 2—and guided along guide rails 103. The trolley 12 is configured to travel in the guide rails 103.

A bearing suspension is disposed between the suspension bar 1 and the cabin 2, which will be explained in more detail below with reference to FIG. 2. The bearing suspension has a bearing 3 which allows the cableway cabin 2 to be rotated about an approximately vertical axis with respect to the suspension bar 1.

Figure 2:
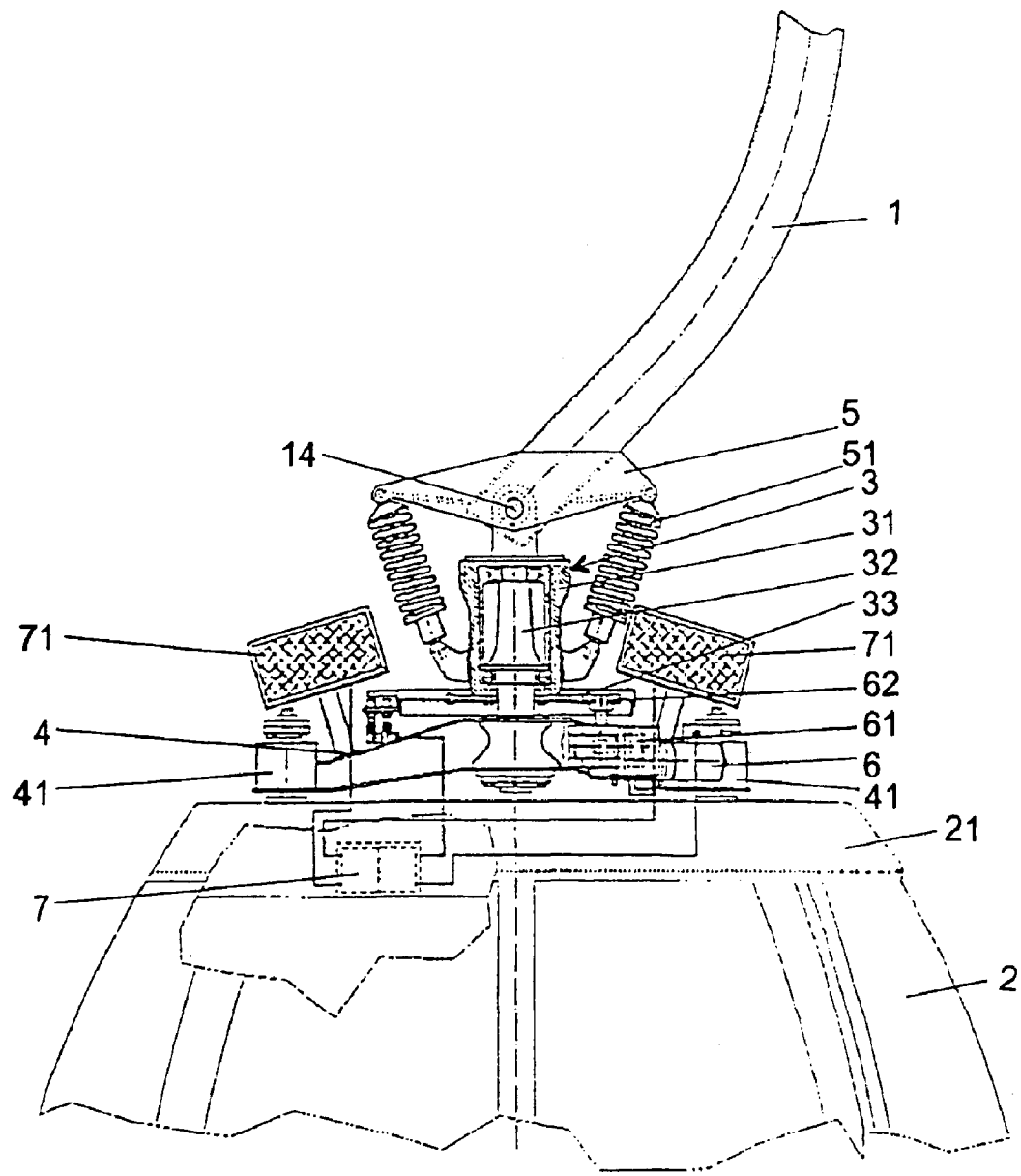
FIG. 2 is detail of the cableway cabin, on a scale that is enlarged with respect to FIG. 1.

With reference to FIG. 2, at the lower end of the suspension bar 1, an approximately vertically aligned bearing sleeve 31 is attached to the latter by way of a bolt 14. The bolt 14 extends approximately horizontal and the bearing sleeve 31 can be pivoted about the bolt 14 with respect to the suspension bar 1. A rotary pin 32, to whose lower end the cableway cabin 2 is fixed, projects into the bearing sleeve 31 from below. In this way, the cableway cabin 2 is mounted such that it can rotate about a vertical axis with respect to the suspension bar 1. Furthermore, at the lower end of the rotary pin 32 there is provided a load-bearing device 4, to whose free ends the cableway cabin 2 is fixed via damping elements 41.

In addition, at the lower end of the suspension bar 1 there is provided an approximately horizontally aligned load-bearing beam 5, to which one of the ends of two shock absorbers 51 are attached. The other ends of the shock absorbers 51 are attached to the bearing sleeve 31. By means of these shock absorbers 51, the pivoting movement of the cableway cabin 2 about the bolt 14 is damped.

Furthermore, an electric motor 6 is disposed on the roof 21 of the cableway cabin 2. The motor 6 interacts via a double worm gear mechanism 61 and a drive pinion 62 with a toothed ring 33 that is rigidly fixed to the bearing sleeve 31. Since the bearing sleeve 31 cannot rotate, the drive of the electric motor 6 effects rotation of the cableway cabin 2 about the approximately vertically aligned axis of rotation of the bearing 3.

Furthermore, a control unit 7 for the electric motor 6, a battery and solar cells 71, by means of which the battery is charged, are provided in the cableway cabin 2.

By means of a cableway cabin of this type, the requirements with regard to the intended comfort are met.

While the invention has been described above with reference to a cabin, it is analogously applicable to chairs of chairlifts and similar transportation devices that belong into the realm of an aerial cableway system with transportation devices that can be fixed to the suspension bar such that they can rotate with respect to the latter.

I claim:

1. A cableway system, comprising:

terminal stations formed with deflection wheels;

an endless load-bearing and conveying cable extending between said terminal stations and traveling about said deflection wheels in said terminal stations;

transportation devices each having a load-bearing suspension bar to be clamped to said cable for slaving the respective said transportation device along between said terminal stations;

a bearing for rotatably mounting said transportation device to said suspension bar about a substantially vertical axis; and a damping device disposed to damp the mounting between said bearing and said suspension bar.

2. The cableway system according to claim 1, which comprises a substantially horizontal beam disposed at a lover end of said suspension bar, and damping elements having first ends attached to said beam and second ends attached to said bearing.

3. The cableway system according to claim 1, wherein said transportation device is a cableway cabin with a roof, and a drive motor is disposed on said roof of said cableway cabin, for rotating said cableway cabin relative to said suspension bar.

4. The cableway system according to claim 1, which further comprises solar elements supported on said transportation device.

5. The cableway system according to claim 3, which further comprises solar elements supported on said roof of said cableway cabin.

6. The cableway system according to claim 1, wherein said transportation devices are cabins or chairs.

* * * * *